US007576559B2

(12) United States Patent
Song et al.

(10) Patent No.: US 7,576,559 B2
(45) Date of Patent: Aug. 18, 2009

(54) USB DEVICE AND DATA PROCESSING SYSTEM HAVING THE SAME

(75) Inventors: Yoon-Beom Song, Seongnam-si (KR); Choong-Bin Lim, Yongin-si (KR); Sang-Jun Mun, Incheon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 467 days.

(21) Appl. No.: 11/558,186

(22) Filed: Nov. 9, 2006

(65) Prior Publication Data

US 2007/0241769 A1 Oct. 18, 2007

(30) Foreign Application Priority Data

Jan. 16, 2006 (KR) .................. 10-2006-0004435

(51) Int. Cl.
*H03K 19/003* (2006.01)
*G06F 13/00* (2006.01)
(52) U.S. Cl. .................. 326/30; 710/100; 710/302; 710/304; 710/313
(58) Field of Classification Search .................. 326/30, 326/21, 86; 710/100, 302, 304, 313
See application file for complete search history.

(56) References Cited

U.S. PATENT DOCUMENTS

| 6,542,946 | B1 * | 4/2003 | Wooten ...................... 710/106 |
| 6,593,768 | B1 * | 7/2003 | Iyer et al. ...................... 326/30 |
| 6,717,439 | B2 * | 4/2004 | Ohkubo ........................ 326/86 |
| 6,813,672 | B1 * | 11/2004 | Kamran et al. ............... 710/305 |
| 6,882,174 | B2 * | 4/2005 | Niwa ............................ 326/30 |
| 7,024,504 | B2 * | 4/2006 | Saito et al. .................. 710/110 |
| 2004/0186934 | A1 * | 9/2004 | Beck ............................ 710/60 |
| 2005/0120146 | A1 * | 6/2005 | Chen et al. .................... 710/22 |
| 2005/0144345 | A1 * | 6/2005 | Nakano ...................... 710/100 |

FOREIGN PATENT DOCUMENTS

| JP | 06-152610 | 5/1994 |
| JP | 1998301899 A | 11/1998 |
| JP | 2003-241870 | 8/2003 |
| JP | 2004-064620 | 2/2004 |
| KR | 1020030015982 A | 2/2003 |
| KR | 1020050043503 A | 5/2005 |

* cited by examiner

*Primary Examiner*—Vibol Tan
(74) *Attorney, Agent, or Firm*—F. Chau & Assoc., LLC

(57) ABSTRACT

A universal serial bus (USB) device is comprised of a receiver for receiving signals from a USB host through data lines, and a pull-up resistor circuit connecting pull-up resistors to data lines in response to control signals. The pull-up resistor circuit selectively connects a plurality of pull-up resistors with a data line in response to control signals. The pull-up resistor circuit controls a number of the plurality of pull-up resistors connected with the data line to cause a voltage level of the signal to be lower than a threshold voltage when the USB host resets the USB device.

18 Claims, 5 Drawing Sheets

USB DEVICE AND DATA PROCESSING SYSTEM HAVING THE SAME

CROSS-REFERENCE TO RELATED APPLICATION

This U.S. non-provisional patent application claims priority under 35 U.S.C. § 119 Korean Patent Application No. 2006-04435 filed on Jan. 16, 2006, the entire contents of which are hereby incorporated by reference.

BACKGROUND

The present disclosure generally relates to universal serial bus (USB) systems.

Universal serial bus (USB) systems, widely used as an interfacing tool with peripheral devices of computer systems, recently are operable in situations involving plug-and-play (PnP), automatic allocation of identification (ID), and hot plugging functions. A USB cable is usually organized of four lines only, that is, two signal lines, a power source line, and a ground line. Thus, it is possible to fabricate small USB cables and small connectors, which reduces product cost and which further enables developing inexpensive peripheral devices.

According to 'USB specification Revision 2.0 (Apr. 4, 2000)', a high speed mode supports data transmission at the rate of 480 Mb/s, and low and full speed modes support 1.25 Mb/s and 12 Mb/s, respectively.

The USB host and device are active in one of several operation modes. This one operation mode is set by initializing with a predetermined configuration when the USB device links to the USB host. For smooth data communication between the USB host and device after initialization, it needs only to correctly execute the initialization.

SUMMARY OF THE INVENTION

Therefore, exemplary embodiments of the present invention are directed to a USB device capable of correctly executing an initialization operation.

Exemplary embodiments of the present invention are also directed to a method of controlling a USB device for correct initialization.

Exemplary embodiments of the present invention are also directed to a data processing system capable of correctly executing an initialization operation between a USB host and a peripheral device.

An exemplary embodiment of the present invention is a USB device connected to a USB host through a USB, including: a receiver for receiving a signal through a data line of the USB; and a pull-up resistor circuit selectively connecting a plurality of pull-up resistors with a data line in response to control signals, wherein the pull-up resistor circuit controls a umber of the plurality of pull-up resistors connected with the data line to cause a voltage level of the signal to be lower than a threshold voltage when the USB host resets the USB device.

The pull-up resistor circuit controls a number of the plurality of pull-up resistors connected with the data line to cause the voltage level of the signal to be lower than the threshold voltage after a predetermined time has elapsed since the USB host has reset the USB device.

The pull-up resistor circuit comprises plurality of pull-up resistors, a first switch, a plurality of second switches, and a control circuit. The plurality of pull-up resistors are sequentially connected in series, and one end of the series is coupled with a power source voltage. The first switch is coupled between the data line and the other end of the plurality of pull-up resistors. The plurality of second switches are connected in parallel, respectively, with the plurality of pull-up resistors, and the control circuit turns the plurality of second switches on/off in response to control signals that it produces.

The first switch is controlled by the pull-up enabling signal that is activated upon detecting a connection between the USB device and the USB host.

The control circuit includes: a timer activated by the pull-up enabling signal and outputting a timing signal of first level after a predetermined time has elapsed since the line state signal has been set in a state of SE0; a logic gate outputting a switch enabling signal in response to the first and second control signals and the timing signal; and a switch control circuit activated by the switch enabling signal, altering on/off operations of the plurality of second switches in a predetermined order, in response to a detection signal, until the voltage level of the signal is lower than the threshold voltage.

In an exemplary embodiment of the present invention, a USB device connected to a USB host through a USB includes: a receiver for receiving a signal through a data line of the USB; a functional circuit block receiving the signal from the receiver and outputting control signals; a squelch detector generating a detection signal upon sensing that a voltage level of the signal received through the data line of the USB is lower than a threshold voltage; and a pull-up resistor circuit selectively connecting pull-up resistors to the data line, wherein the pull-up resistor circuit controls the number of pull-up resistors connected with the data line to make a voltage level of the signal lower than a threshold voltage when the USB host resets the USB device.

In an exemplary embodiment of the present invention, a data processing system includes a host, and a USB device connected to the host through a USB. The USB device comprises: a receiver for receiving a signal through a data line of the USB; and a pull-up resistor circuit selectively connecting pull-up resistors to make a voltage level of the signal lower than a threshold voltage when the host resets the USB device.

A further understanding of the nature and advantages of the exemplary embodiments described herein may be realized by reference to the remaining portions of the specification and the attached drawings.

BRIEF DESCRIPTION OF THE DRAWINGS

Exemplary embodiments of the present invention will be understood in more detail from the following descriptions taken in conjunction with the attached drawings. In the drawings.

DETAILED DESCRIPTION OF EXEMPLARY EMBODIMENTS

Exemplary embodiments of the present invention will be described below in more detail with reference to the accompanying drawings. The invention may, however, be embodied in different forms and should not be construed as limited to the exemplary embodiments set forth herein. Rather, these exemplary embodiments are provided so that this disclosure will be thorough and complete, and will fully convey the scope of the invention to those skilled in the art.

Figure 1:
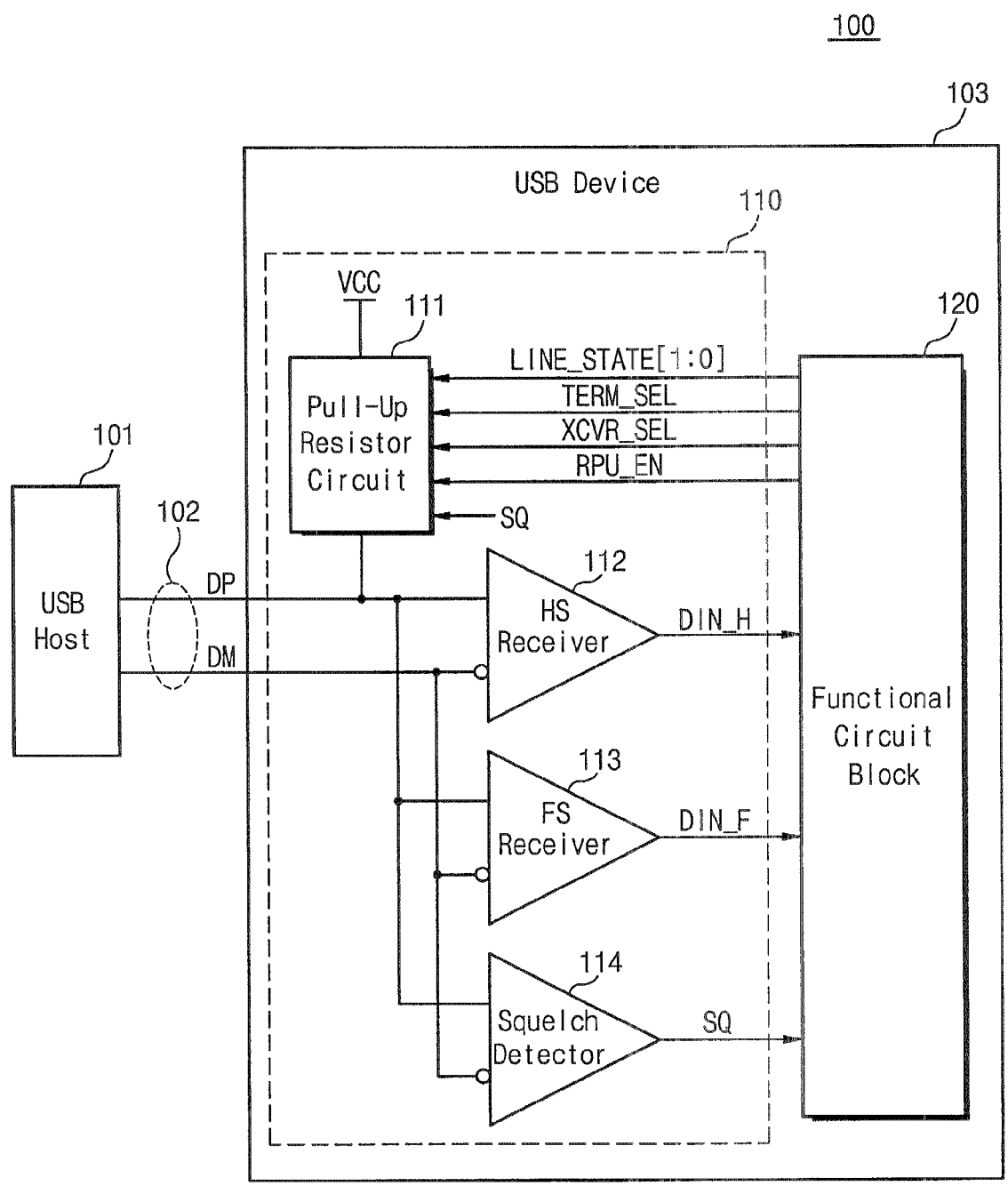
FIG. 1 is a diagram illustrating a data processing system in accordance with an exemplary embodiment of the present invention.

FIG. 1 is a diagram illustrating a data processing system in accordance with an exemplary embodiment of the present invention.

Referring to FIG. 1, the data processing system 100 is comprised of a USB host 101, and a USB device 103 connected with the USB host 101 through a USB 102. The USB 102 is organized including data lines for transmitting data signals DM and DP that are a couple of differential signals, and power lines (not shown) for supplying a power source voltage VCC and a ground voltage.

The USB device 103 is comprised of a transceiver 110 and a functional circuit block 120. While FIG. 1 shows the transceiver 110 that just has circuit components of relevance to the data receiving function provided by this exemplary embodiment, there are other circuit elements for data transmission that are not shown in the transceiver 110. The transceiver 110 includes a pull-up resistor circuit 111, a high speed (HS) receiver 112, a full speed (SP) receiver 113, and a squelch detector 114. The functional circuit block 120 acts as a controller for regulating the data transceiver operations between the USB device 103 and the USB host 101.

The HS receiver 112 is used for receiving data signals in a HS operation mode, while the FS receiver 113 is used for receiving data signals in a FS operation mode. The data signals DIN_H and DIN_F received respectively through the receivers 112 and 113 are supplied into the functional circuit block 120.

The squelch detector 114 senses whether the data signals DP and DM transferred through the data lines are noises or are effective signals. Namely, the squelch detector 114 compares the data signals DP and DM with a squelch threshold voltage VHSSQ and outputs a detection signal SQ. For instance, the squelch detector 114 generates the detection signal SQ at a high level when the transferred data signal is smaller than 100 mV, while it generates the detection signal SQ at a low level when the transferred data signal is larger than 150 mV. In this exemplary embodiment, the squelch threshold voltage VHSSQ means that the minimum signal level is 100 mV. The detection signal SQ from the squelch detector 114 is applied to the functional circuit block 120.

The functional circuit block 120 receives the data signals DIN_H and DIN_F from the receivers 112 and 113, and outputs control signals when it detects that the USB device 103 is being connected with the USB host 101 through the USB 102. The control signals output from the functional circuit block 120 include a line state signal LINE_STATE[1:0], first and second control signal TERM_SEL and XCVR_SEL indicating an operation mode, and a pull-up enabling signal RPU_EN.

The pull-up resistor circuit 111 connects an appropriate one of the pull-up resistors to a data line, through which the data signal DP is transferred, in response to the control signals LINE_STATE[1:0], TERM_SEL, and SCVR_SEL, the pull-up enabling signal RPU_EN, from the functional circuit block 120, and the detection signal SQ from the squelch detector 114.

Figure 2:
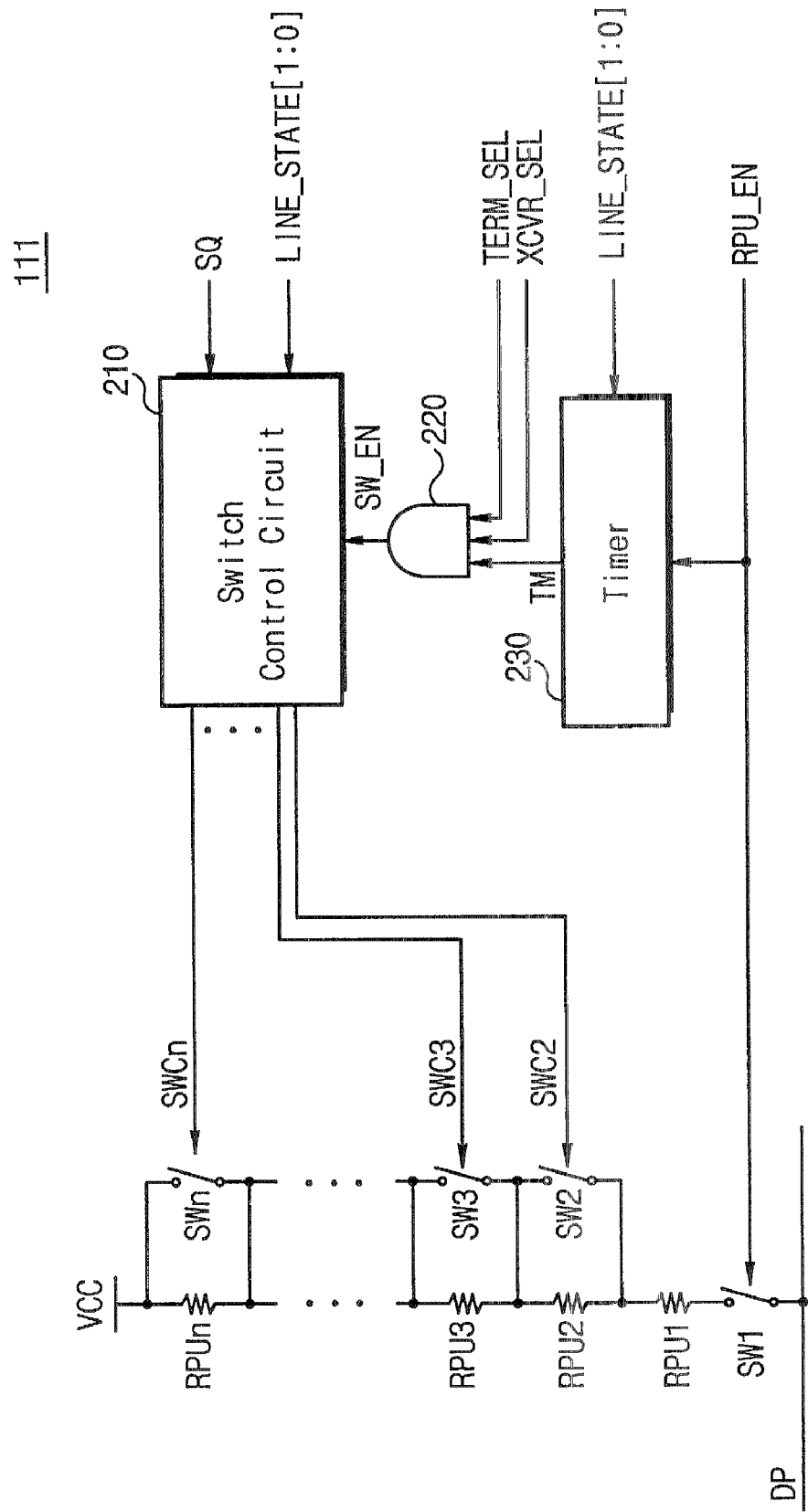
FIG. 2 is a diagram illustrating a detailed organization of a pull-up resistor used in the system shown in FIG. 1.

A detailed circuit diagram of the pull-up resistor circuit 111 shown by FIG. 1 is illustrated in FIG. 2. Referring to FIG. 2, the pull-up resistor circuit 111 is comprised of a plurality of pull-up resistors RPU1~RPUn, a plurality of switches SW1~SWn, a switch control circuit 210, and AND gate 220, and a timer 230.

The plurality of pull-up resistors RPU1~RPUn are coupled with each other in series. One end of the pull-up resistor RPUn is coupled to the power source voltage VCC, while one end of the pull-up resistor RPU1 is coupled to one terminal of the switch SW1. The other end of the switch SW1 is connected to the data line transferring the data signal DP. The other switches SW2~SWn are each correspondingly coupled in parallel with pull-up resistors RPU2~RPUn, respectably. The other switches SW2~SWn are each regulated by respective switch control signals SWC2~SWCn provided from the switch control circuit 210. The switch SW1 is controlled by a pull-up enabling signal RPU_EN from the functional circuit block 120 shown in FIG. 1.

Figure 3:
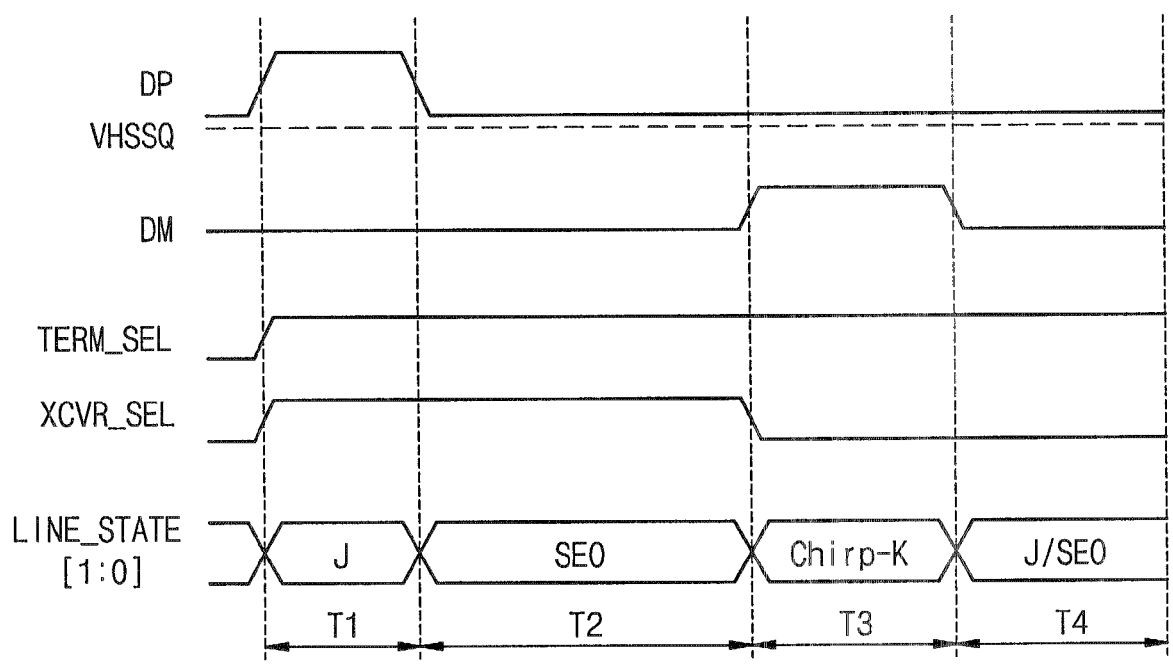
FIGS. 3 and 4 are timing diagrams of signals used in the pull-up resistor circuit used in the system shown in FIG. 1.

The timer 230 starts a counting operation in response to activation of the pull-up enabling signal RPU_EN, generating a timing signal TM of high level when a counting value reaches a predetermined value, for example 2 ms. The timer 230 outputs the timing signal TM at a low level when the lie state signal LINE_STATE turns to a state of Chrip-K from a state of SE0, as shown in FIG. 3.

The AND gate 220 receives the timing signal TM from the timer 230, and the first and second control signals TERM_SE1 and SCVR_SEL from the functional circuit block 120, and outputs a switch enabling signal SW_EN.

The switch control circuit 210 generates the plurality of switch control signals SWC2~SWCn to turn on the plurality of switches SW2~SWn when the switch enabling signal SW_EN becomes a high level. After that, when the line state signal LINE_STATE[1:0] represents the SE0 state, the switch control signals SWC2~SWCn are generated to connect some of the pull-up resistors RPU2~RPUn with the data line that transfers the data signal DP.

The pull-up resistor circuit 111 variably sets the resistance by adjusting the number of pull-up resistors connected between the power source voltage VCC and the data line transferring the data signal DP when the data signals DP and DM are higher than the threshold voltage VHSSQ, while the line state signal LINE_STATE[1:0] remains in the SE0 state.

The operation of the pull-up resistor circuit shown in FIG. 2 will be explained hereinbelow with reference to the timing diagrams of FIGS. 3 and 4.

Figure 4:
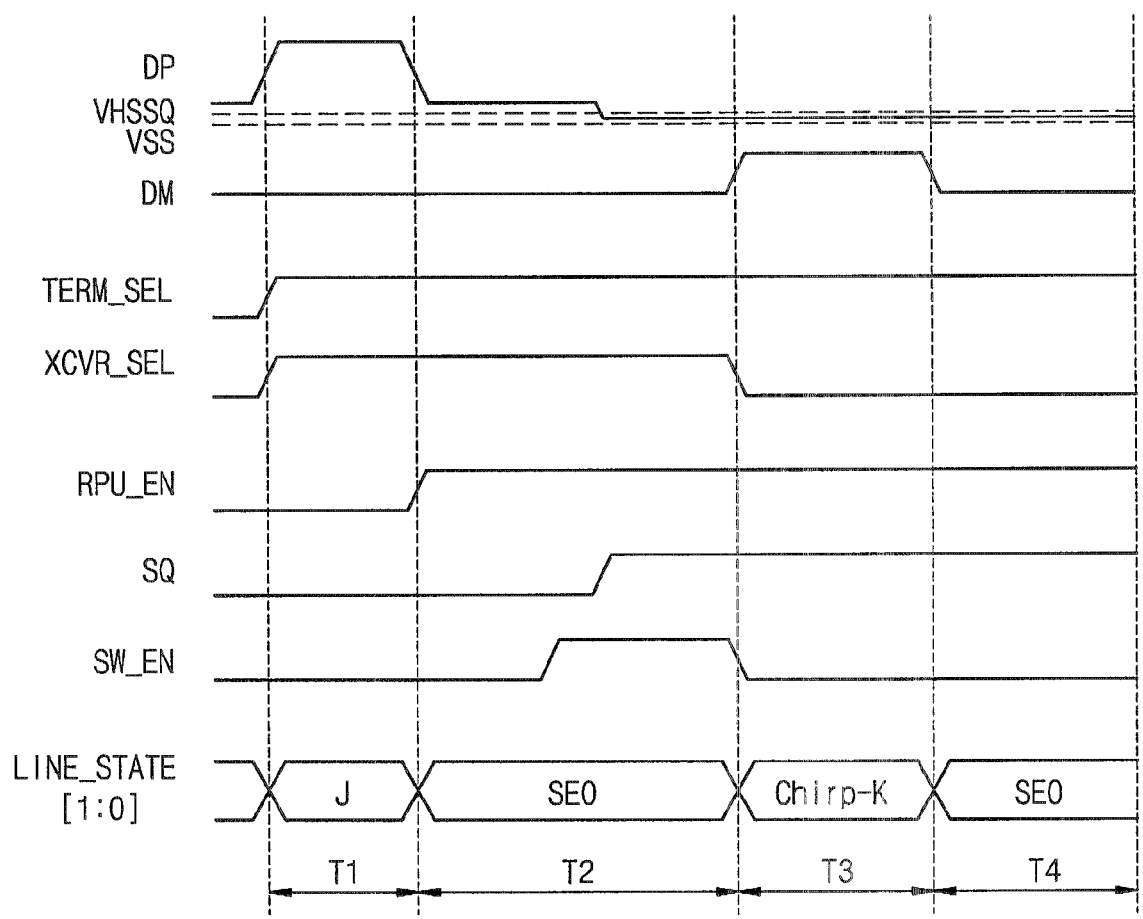

FIGS. 3 and 4 are timing diagrams of signals used in the pull-up resistor circuit 111 shown in FIGS. 1 and 2. First, referring to FIG. 3, when during a first period T1, the USB device 103 is connected to the USB host 101 by way of the USB 102, a voltage level of the data signal DP rises by operation of the pull-up resistor circuit 111 of the USB device 103. The functional circuit block 120 receiving the data signals DIN_H and DIN_F through the HS and FS receivers 112 and 113, respectively, outputs the first and second control signals TERM_SEL and XCVR_SEL at high levels and controls the line state signal LINE_STATE[1:0] to be a state represented as J.

In a second period T2, the USB host 101 drives all of the data signals DP and DM into low levels and resets the USB device 103. The SE0 state in FIG. 2 means a reset state.

In a third period T3, the functional circuit block 120 identifying a line state as SE0 turns the second control signal SCVR_SEL to low level to represent the HS mode and enable the Chirp-K state.

Next, in a fourth period T4, the functional circuit block 120 waits for a state of Chirp-KJ provided from the USB host 101.

During the second period T2 in the timing diagram of FIG. 3, as the first and second control signals TERM_SEL and XCVR_SEL are all at high levels, there is no problem in identifying a line sate as SE0 only when the data signal DP becomes lower than 800 mV in voltage level. On the other hand, in the fourth period T4, as the first and second control signals TERM_SEL and XVCR_SEL are set to high and low levels, respectively, enabling the HS mode, it is able to identify the J state instead of the SE0 state when the data signals DP/DM are higher than the threshold voltage VHSSQ.

In the fourth period T4, the voltage of the data signal DP is defined by the following Equation 1.

$$DPvoltage = VCC \frac{HostTerminationResistance}{HostTerminationResistance + USBpullupResistance} \quad \text{[Equation 1]}$$

As can be seen from Equation 1, the voltage of the data signal DP, that is, the DP voltage, is varied by the host termination resistance as well as by the pull-up resistance of the USB device 103. The host termination resistance of the USB host 101 is 45 Ω±10% in the HS operation mode, while it is 28~45Ω in the FS operation mode.

As such, since the host termination resistance is valued in a wider permissible range, the data signal DP can be conditioned in a wider voltage range. For example, when the power source voltage VCC is 3.3V, the pull-up resistance is 1.5Ω, and the USB host 101 is operating in the HS mode, the voltage of the data signal DP is set in the range of 86.76~105.42 mV. Further, when the power source voltage VCC is 3.3V, the pull-up resistance is 1.5Ω, and the USB host 101 is operating in the FS mode, the voltage of the data signal DP is set in the range of 60.74~94.04 mV. Namely, the voltage of the data signal DP may be higher than the squelch threshold voltage VHSSQ that is 100 mV. In this case, the functional circuit block 120 may identify a line state as another state not the SE0 state in the fourth period T4. This condition may act as an important factor that makes it impossible to conduct smooth initialization and normal data transmission in the USB host 101 and the USB device 103.

FIG. 4 is a timing diagram of signals used in the pull-up resistor circuit 111 according to an exemplary embodiment of the present invention. Referring to FIG. 4, the second period T2 is defined as 2.5~6 ms in the USB specification Revision 2.0 (Apr. 27, 2000). It is preferred for the USB device 103 to detect the SE0 state in 2.5 μs and to generate Chirp-K in 6 ms. During this period, the first a and second control signals TERM_SEL and XCVR_SEL of the USB device 103 are both set to high levels, that is, represent the FS mode, and the functional circuit block 120 does not refer to the detection signal SQ from the squelch detector 114. Therefore, the functional circuit block 120 does not identify a line state as the J state instead of the SE0 state.

In the USB device 103 according to an exemplary embodiment of the present invention, when the voltage level of the data signal DP is detected as being higher than the squelch threshold voltage VHSSQ after 2.5 μs has elapsed since the beginning of the second period T2, the resistance value of the pull-up resistor coupled with the data signal DP is controlled so as to make the voltage level of the data signal DP lower than the squelch threshold voltage VHSSQ. Since the resistance value of the pull-up resister coupled to the data signal DP has been adjusted in the second period T2, the case that the voltage level of the data signal DP is higher than the squelch threshold voltage VHSSQ is not generated. Thus, the possibility of failure to perform a handshake protocol for detecting the HS operation mode is reduced.

Figure 5:
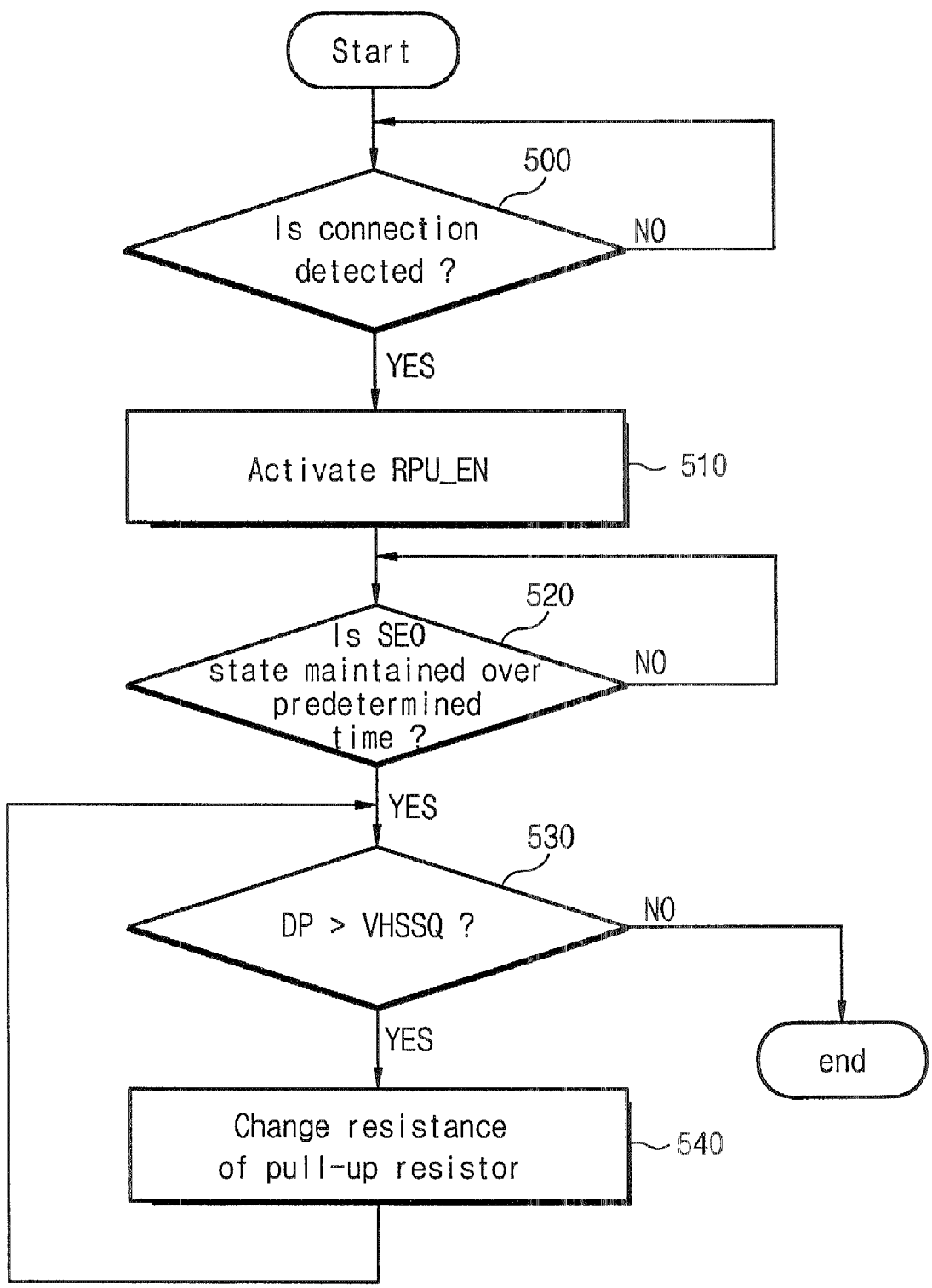
FIG. 5 is a flow chart showing a sequence of controlling a USB device in accordance with an exemplary embodiment of the present invention.

FIG. 5 is a flow chart showing a sequence of steps in controlling the USB device in accordance with an exemplary embodiment of the present invention. Referring to FIGS. 2, 4, and 5, when the USB device 103 is connected with the USB host 101 during the first period T1, the voltage level of the data signal DP increases the pull-up resistor of the USB device 103. Then, the functional circuit block 120 regards the USB device 103 as being connected to the USB host 101, in response to the signals DIN_H and DIN_F output form the HS and FS receivers 112 and 113, respectively, and sets the line state signal LINE_STATE[1:0] to the J state (step 500).

During the second period T2 that is, the SE0 state, if the pull-up enabling signal RPU_EN is activated (step 510), the switch SW1 is turned on to enable the timer 230 to operate. The timer 230 outputs the timing signal TM at a high level (step 520) when an internal timing value lapses over 2 μs. When the first and second control signals TERM_SEL and XCVR_SEL are both set to high levels and the timing signal TM is set to a high level, the AND gate 220 outputs the switch enabling signal SW_EN at a high level.

The switch control circuit 210 turns ON all of the switches SW2~SWn when the line state signal LINE_STATE[1:0] changes to the SE0 state from the J state, making the power source voltage VCC supplied into an and of the pull-up resistor RPU1 through the switches SW2~SWn not through the pull-up resistors RPU2~RPUn.

When the switch enabling signal SW_EN from the AND gate 220 becomes a high level, the switch control circuit 210 operates in response to the detection signal SQ from the squelch detector 114 (step 530). That is, when the detection signal SQ is at a high level, the switch control signals SW2~SWn are output to alter the pull-up resistance between the power source voltage VCC and the data signal DP (step 540). For instance, the resistor RPU1 is 1.5 kΩ and the resistors RPU2~RPUn are designed in the 100~500Ω range. The resistance values of the resistors RPU2~RPUn may be set to be the same or to be different from each other. On the other hand, the pull-up resistors RPU1~RPUn should be designed to have predetermined resistance values, so as to make the total resistance not over 3090Ω when the switch SW1 is turned ON while the switches SW1~SWn are all turned OFF.

As an example, if the resistors RPU2~RPUn are arranged in increasing order of resistance from RPU2 to RPUn, the switch control circuit 210 operates as follows. When the detection signal SQ becomes a high level while the switches SW2~SWn are all turned ON, the switch control circuit 20 turns OFF the switch SW2 but turns ON the rest of the switches SW3~SWn. Thus, a resistance value connected to the data signal DP is in correspondence with the total resistance by the pull-up resistors RPU1 and RPU2. Further, when the detection signal SQ becomes a high level while the switch SW2 is being turned OFF but the switches SW3~SWn are turned ON, the switch control circuit 210 turns OFF only switch SW3 but turns ON the rest of the switches SW2 and SW4~SWn. Thus, a resistance value connected to the data signal DP is in correspondence with the total resistance by the pull-up resistors RPU1 and RPU3. In this manner, it is possible to alter a resistance value connected to the data signal DP. As a result, it is possible to alter a value of the pull-up resistance connected to the data signal DP from a combination of the resistance values of the resistors RPU2~RPUn by setting the number of the turn-off switches SW2~SWn as two or more.

The switch control circuit 210 fixes the switch control signals SWC2~SWCn when the detection signal SQ goes to a high level, thereby terminating the operation of altering the pull-up resistance.

As the voltage level of the data signal DP has been lower than the squelch threshold voltage VHSSQ by the alteration of the pull-up resistance in the second period T2, the data signal DP stays at a voltage level under the squelch threshold voltage VHSSQ. Thus, even when the second control signal XCVR_SEL falls to a low level for setting the HS mode, the functional circuit block 120 does not identify a line state as the J state instead of the SE0 state.

According to exemplary embodiments of the present invention, although there is a variation in the voltage level of the data signal, it is possible to compensate for the voltage variation of the data signal by altering the resistance of the pull-up resistors. Thus, a stable initialization operation is performed when the USB device is connected to the USB host.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A universal serial bus (USB) device connected to a USB host through a USB, comprising:
   a receiver for receiving a signal through a data line of the USB; and
   a pull-up resistor circuit selectively connecting a plurality of pull-up resistors with the data line in response to control signals fed thereto, wherein the pull-up resistor circuit controls a number of the plurality of pull-up resistors connected with the data line to cause a voltage level of the signal to be lower than a threshold voltage when the USB host resets the USB device.

2. The USB device as set forth in claim 1, wherein the pull-up resistor circuit controls the number of the plurality pull-up resistors connected with the data line to cause the voltage level of the signal to be lower than the threshold voltage after a predetermined time has elapsed since the USB host has reset the USB device.

3. The USB device as set forth in claim 2, wherein the pull-up resistor circuit comprises:
   the plurality of pull-up resistors being sequentially connected to each other in series, one end of the series connection being coupled with a power source voltage;
   a first switch coupled between the data line and another end of the series connected pull-up resistors;
   a plurality of second switches respectively coupled in parallel with each of the plurality of pull-up resistors except for a first resistor connected to the data line; and
   a control circuit turning the first switch and the plurality of second switches on/off in response to control signals produced thereby.

4. The USB device as set forth in claim 3, wherein the control signals include first and second control signals indicating respective transmission speeds, a line state signal representing a state of the data line in the USB device, and a pull-up enabling signal.

5. The USB device as set forth in claim 4, wherein the first switch is controlled by the pull-up enabling signal that is activated upon detecting a connection between the USB device and the USB host.

6. The USB device as set forth in claim 4, wherein the control circuit comprises:
   a timer activated by the pull-up enabling signal, outputting a timing signal of a first level after a predetermined time has elapsed since the line state signal has been set in a state of SE0;
   a logic gate outputting a switch enabling signal in response to the first and second control signals and the timing signal; and
   a switch control circuit activated by the switch enabling signal, altering on/off operations of the plurality of second switches in a predetermined order, in response to a detection signal, until the voltage level of the signal is lower than the threshold voltage.

7. The USB device as set forth in claim 6, wherein the switch control circuit is disabled when the line state signal indicates termination of the SE0 state.

8. The USB device as set forth in claim 6, wherein the plurality of pull-up resistors are different from each other in resistance value.

9. The USB device as set forth in claim 8, wherein a sum of resistance values of the plurality of pull-up resistors is not over 3090 Ω.

10. A universal serial bus (USB) device connected to a USB host through a USB, comprising:
    a receiver for receiving a signal through a data line of the USB;
    a functional circuit block receiving the signal from the receiver and outputting control signals;
    a squelch detector generating a detection signal upon sensing that a voltage level of the signal received through the data line of the USB is lower than a threshold voltage; and
    a pull-up resistor circuit selectively connecting a plurality of pull-up resistors to the data line, wherein the pull-up resistor circuit controls a number of the pull-up resistors connected with the data line to cause a voltage level of the signal to be lower than the threshold voltage when the USB host resets the USB device.

11. The USB device as set forth in claim 10, wherein the control signals include first and second control signals indicating respective transmission speeds, a line state signal representing a state of the data lien in the USB device, and a pull-up enabling signal.

12. The USB device as set forth in claim 11, wherein the pull-up resistor circuit comprises:
    the plurality of pull-up resistors being sequentially connected to each other in series, one end of the series connection being coupled with a power source voltage;
    a first switch coupled between the data lien and another end of the series connected pull-up resistors;
    a plurality of second switches respectively coupled in parallel with each of the plurality of pull-up resistors except for a first resistor connected to the data line;
    a timer activated by the pull-up enabling signal, outputting a timing signal of first level after a predetermined time has elapsed since the line state signal has been set in a state of SE0;
    a logic gate outputting a switch enabling signal in response to the first and second control signals and the timing signal; and
    a switch control circuit activated by the switch enabling signal, altering on/off operations of the plurality of second switches in a predetermined order, in response to the detection signal, until the voltage level of the signal is lower than the threshold voltage, and being disabled when the line state signal indicates termination of the SE0 state.

13. The USB device as set forth in claim 12, wherein the first switch is controlled by the pull-up enabling signal that is activated upon detecting a connection between the USB device and the USB host.

14. A data processing system comprising:
a host; and
a universal serial bus device connected to the host through a USB,
wherein the USB device comprises:
a receiver for receiving a signal through a data line of the USB; and
a pull-up resistor circuit selectively connecting a plurality of pull-up resistors with the data line in response to control signals fed thereto, wherein the pull-up resistor circuit controls a number of the plurality of pull-up resistors connected with the data line to cause a voltage level of the signal to be lower than a threshold voltage when the host resets the USB device.

15. A method for operating a universal serial bus (USB) device connected with a USB host through a USB, comprising:
a first step of determining whether a data line of the USB is conditioned in a predetermined SE0 state;
a second step of determining whether a voltage level of the data line is higher than a threshold voltage when the data line is conditioned in the SE0 state; and
a third step of changing a number of a plurality of pull-up resistors connected to the data line when the voltage level of the data lien is higher than the threshold voltage.

16. The method as set forth in claim 15, wherein the first step is comprised of determining whether the voltage level of the data line is higher than the threshold voltage after a predetermined time has elapsed since the data line has turned into the SE0 state.

17. The method as set forth in claim 16, wherein the predetermined time is 2 μs at minimum.

18. The method as set forth in claim 15, wherein the second and third steps are repeated until the data line turns to a predetermined Chirp-K state from the SE0 state.

* * * * *